Aug. 6, 1935.  J. L. HEROLD ET AL  2,010,667
APPARATUS FOR PASTEURIZING LIQUIDS IN CONTAINERS
Filed Sept. 19, 1932  3 Sheets-Sheet 1
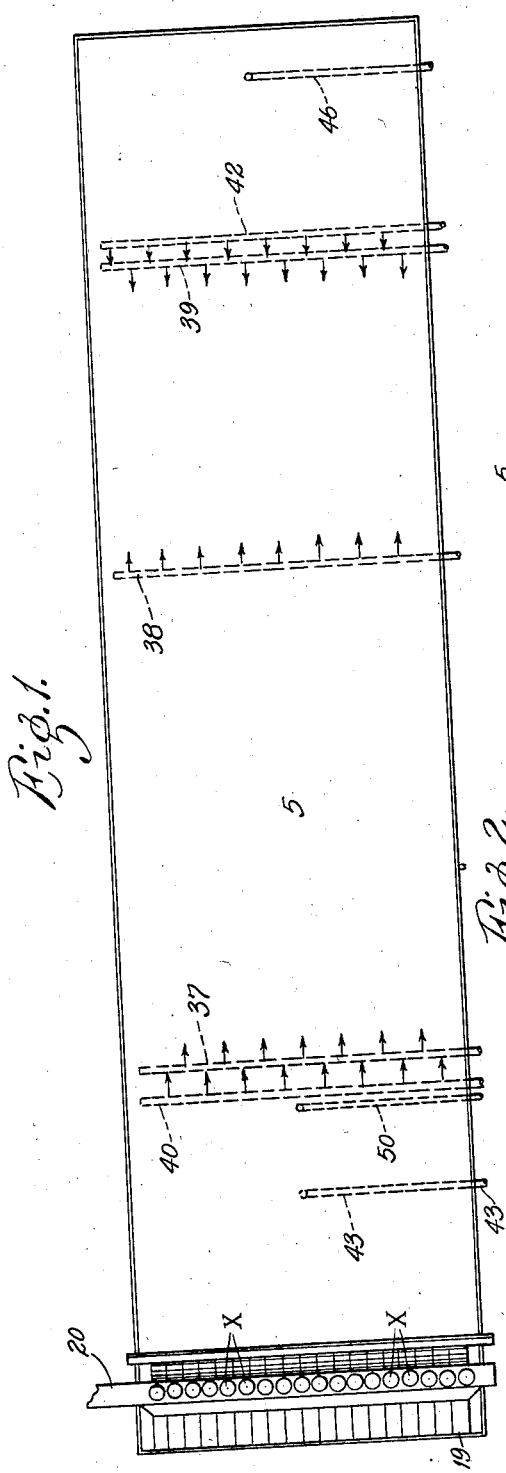
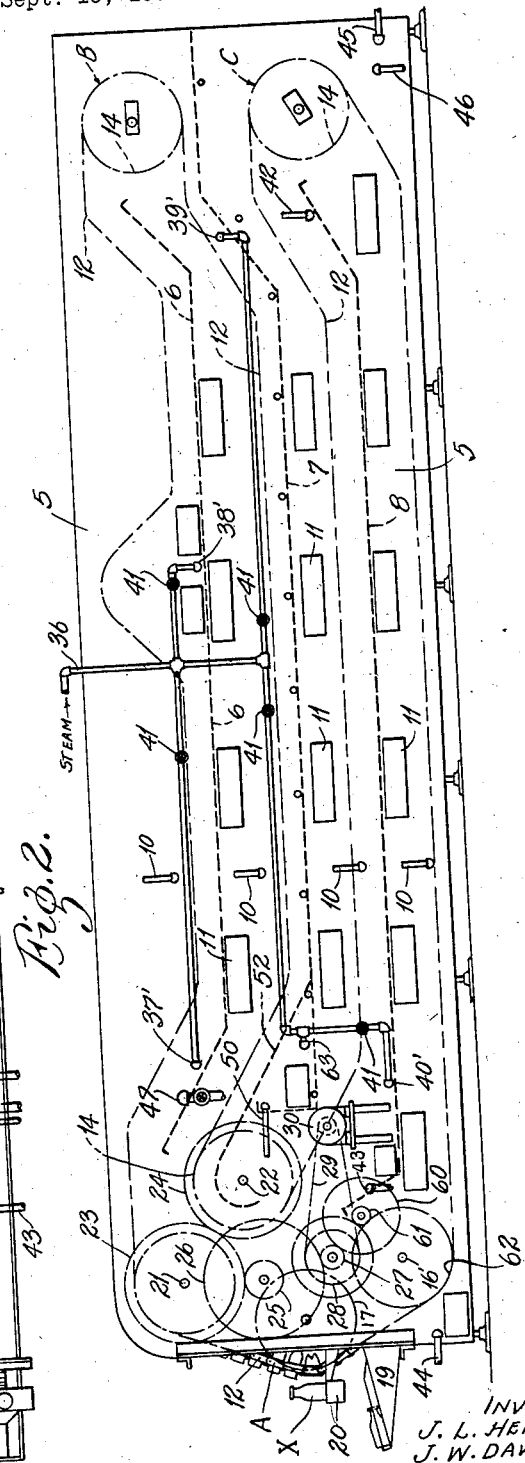
INVENTORS
J. L. HEROLD,
J. W. DAWSON.
BY Albert J. McCauley
ATTORNEY.

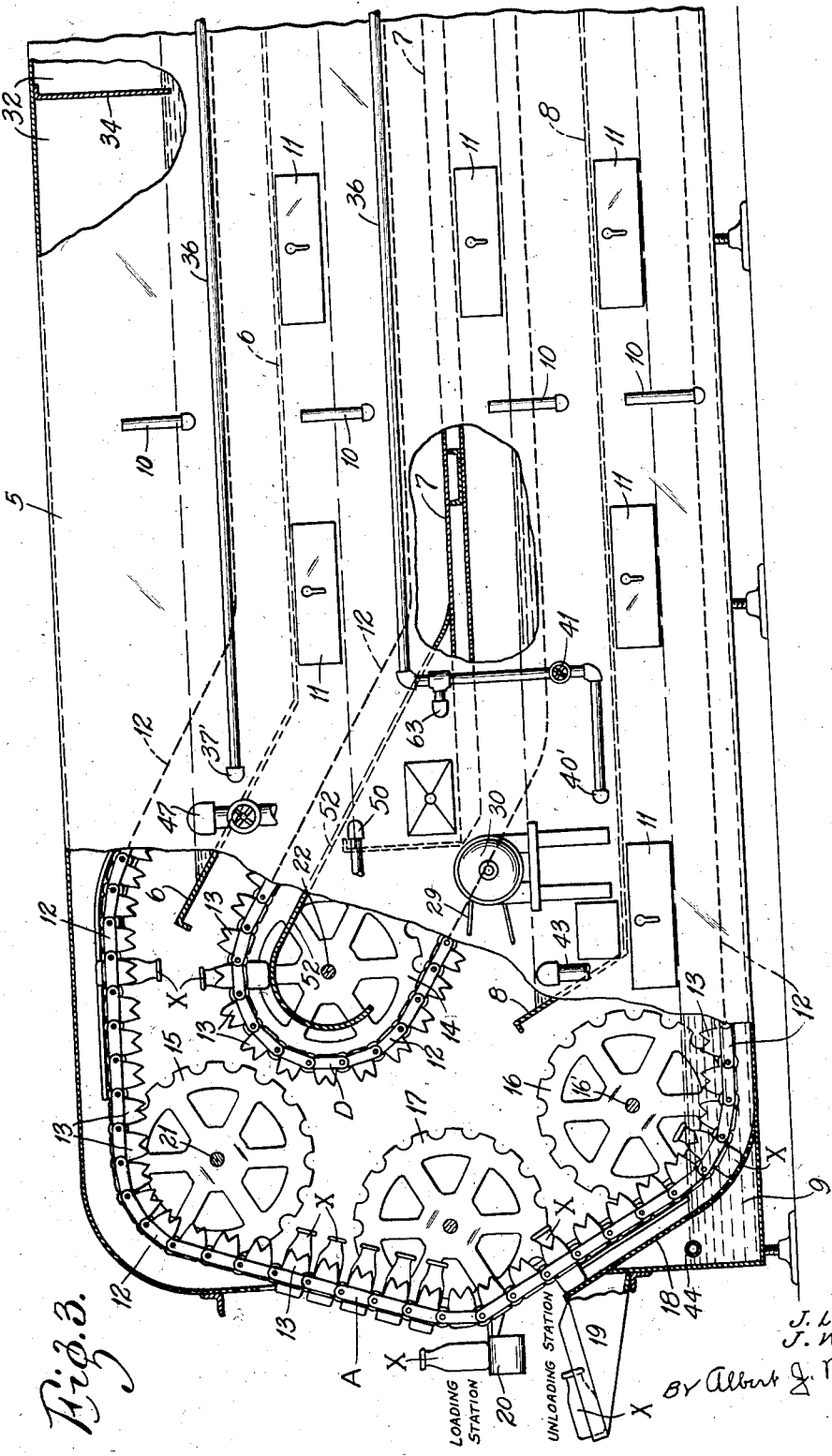

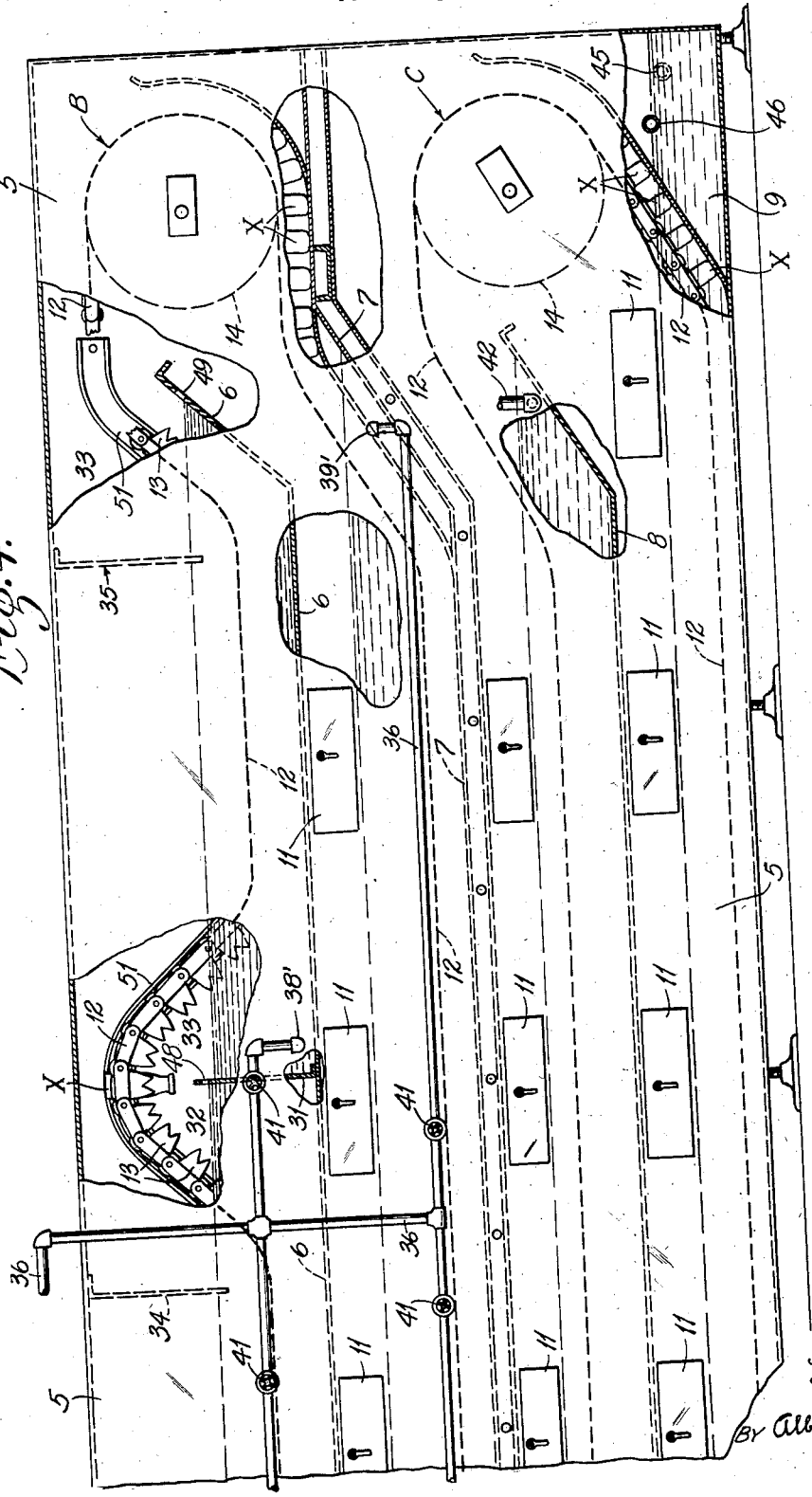

Patented Aug. 6, 1935

2,010,667

UNITED STATES PATENT OFFICE 2,010,667

APPARATUS FOR PASTEURIZING LIQUIDS IN CONTAINERS

James L. Herold and Joseph W. Dawson, St. Louis, Mo., assignors to Barry-Wehmiller Machinery Company, St. Louis, Mo., a corporation of Missouri Application September 19, 1932, Serial No. 633,718

5 Claims. (Cl. 126—272)

This invention relates to an apparatus for pasteurizing liquids in containers. To illustrate the invention we have shown and will hereafter describe an endless conveyor provided with holders for bottles which contain the liquid to be pasteurized, but it is to be understood that the term "bottles" as herein used extends to any suitable containers made of glass or other material.

Prior to this invention, bottled liquids have been pasteurized in baskets pivotally suspended from an endless conveyor which travels through very high vertical compartments containing pre-heating, pasteurizing and cooling liquids.

One of our objects is to dispense with the very tall vertical compartments.

Another object is to avoid, or minimize, the transfer of heat from the pasteurizing compartment to the cooling compartment which occurs in the ordinary pasteurizer wherein a vertical wall separates these compartments.

More specifically stated, an object is to produce a horizontal pasteurizer having important advantages not found in the usual vertical pasteurizer.

A further object is to produce a simple pasteurizer of this kind wherein the bottles are conveniently loaded and unloaded by a single operator at one end of the machine.

Other objects are to rapidly pasteurize and thereafter quickly cool the liquid in the bottles.

In one form of the invention hereafter described, the relatively cool bottled liquid enters and slowly travels through a horizontally elongated body of preheating liquid, and as a result of the natural thermic circulation in the bottles, the hottest liquid rises to the upper portions of the bottles. Furthermore, there is a thermic circulation in the long horizontal body of liquid which transfers this heat to the bottles. As a consequence, the hottest liquid tends to remain at the upper portion of the bottle.

However, this preliminary heating is continued until the desired high temperature is obtained when the bottled liquid enters a preliminary pasteurizing compartment, and the object is to maintain the bottled liquid at a uniform temperature during the entire pasteurizing operation. This operation is carried out in shallow bodies of heating liquid, so any slight variation in temperature due to thermic circulation of this heating liquid is minimized, and the bottles are inverted in passing from one horizontal pasteurizing compartment to another, so as to effectively overcome the objections to thermic circulation.

A similar result occurs when the bottles containing the pasteurized liquid are inverted while passing from one body of cooling liquid to the other, so as to cause a thermic circulation which tends to uniformly cool the pasteurized liquid.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a top view of an apparatus embodying the features of this invention.

Fig. 2 is a side view.

Fig. 3 is a side view on a larger scale, partly in section, showing about one-half of the apparatus.

Fig. 4 is a view similar to Fig. 3 showing the other half of the apparatus, and including an intermediate portion of the apparatus which appears in Fig. 3.

The preferred form of the invention comprises a horizontally elongated housing 5 provided with an upper receptacle 6 containing an elongated body of heating liquid, a horizontally elongated receptacle 7 located below the receptacle 6 and containing a body of pasteurizing liquid, a lower horizontal receptacle 8 containing a body of cooling liquid, and a horizontal body of refrigerating liquid 9 below said cooling liquid. These receptacles may be provided with gauges 10 to indicate the liquid levels therein, and closures 11 which may be opened to inspect and cleanse the several compartments.

An endless conveyor 12 travels through these receptacles, in the order named, and this conveyor is provided with holders in the form of pockets, or buckets, 13 adapted to receive bottles X or equivalent receptacles containing the liquid to be pasteurized.

The holders 13 are secured to the endless conveyor, so the containers will travel with the conveyor, and they will be inverted whenever the conveyor is subjected to a return bend in passing from one horizontal compartment to another.

The housing is thus provided with a series of horizontal compartments wherein the bottled liquid carried by the conveyor is gradually heated, pasteurized and then cooled in a novel manner to be hereafter more fully described.

Attention is now directed to the manner in which the endless conveyor surrounds two of the horizontal compartments, while embracing another of said compartments, and also to the arrangement which permits the bottles to be fed into and discharged from the conveyor at stations adjacent to each other, so that a single operator at one end of the apparatus can very conveniently observe and attend to the admission and discharge of the bottles.

The conveyor 12 herein shown surrounds the preheating receptacle 6 and cooling receptacle 8, and it has a horizontally elongated intermediate loop which embraces, but does not entirely surround the pasteurizing receptacle 7.

More specifically stated, the endless conveyor comprises an approximately upright portion A which extends approximately from the top to the bottom of the front end of the apparatus, returns bends B and C near the rear of the apparatus, and an intermediate return bend D near the front of the apparatus. The loops at the return bends are supported by guide wheels 14 around which the conveyor passes. Similar wheels 15 and 16 may be located near the front corners of the apparatus.

The front portion of the conveyor (Fig. 3) is deflected by means of a suitable number of wheels 17, to provide an inclined lower portion from which the bottles are discharged by gravity, and an oppositely inclined upper portion which prevents discharge of the bottle above the loading station. While the bottles travel upwardly from the refrigerating liquid 9, they are confined by an inclined plate 18 which terminates at the inclined table 19, so the bottles are discharged by gravity onto this table.

At the loading station, immediately above the table 19, the bottles are removed by hand from a support 20 and introduced into the oppositely inclined ascending portion of the conveyor.

The means for transmitting power to the endless traveling conveyor may include shafts 21 and 22 near the front upper corner of the apparatus (Figs. 2 and 3), and a train of gearing shown diagrammatically in Fig. 2. This gearing comprises large gears 23 and 24 fixed to the respective shafts 21 and 22, said gears being in mesh with each other, a pinion 25 meshing with the gear 23, a large gear 26 secured to said pinion 25 and meshing with a lower pinion 27, the latter being secured to a wheel 28 provided with a belt 29 driven by a motor 30.

Driving power may be transmitted to the shaft 16' near the lower left hand corner of Figures 2 and 3 through the medium of the gearing shown diagrammatically in Fig. 2, said gearing including a large gear 60 meshing with the pinion 27, a pinion 61 secured to said gear 60, and a large gear 62 meshing with said pinion 61, said gear 62 being fixed to the shaft 16'.

The driving speed may be varied in any suitable manner, to provide a relatively low speed desired for the treatment of liquid in large bottles, and higher speeds for the same treatment of liquid in smaller bottles.

Each of the long horizontal receptacles contains a body of liquid through which the conveyor travels, and the upper receptacle may be provided with a partition 31 (Fig. 4) whereby it is divided into a preheating compartment 32 at the left of the partition and a preliminary pasteurizing compartment 33 at the right thereof. Baffle members 34 and 35 (Fig. 4) extend from the top of the housing to the liquids in the compartments 32 and 33, thereby forming seals to provide a vapor chamber between them. These baffles also prevent free circulation of air and vapors above the receptacle 6.

The means for maintaining the desired relatively high temperatures may include a steam supply pipe 36 having suitable branches, as shown in Figures 2, 3 and 4, leading to horizontal discharge pipes 37, 38, 39 and 40 arranged transversely of the apparatus, and secured to elbows 37', 38', 39' and 40'. The discharge pipe 37 at the elbow 37' is located in the front end of the preheating compartment, and it discharges the steam toward the rear end. The discharge pipe 38 extends from the elbow 38' at the front of the preliminary pasteurizing compartment, and the similar pipe 39 extends from the elbow 39' at the rear end of the main pasteurizing receptacle. The lower discharge pipe 40 extends from the elbow 40' and lies in the front end portion of the cooling compartment 8 where it discharges a limited volume of steam to prevent a very rapid cooling of the bottles as they enter the cooling liquid. A steam pipe 63 (Figures 2 and 3) discharges steam into the front end portion of the pasteurizing compartment 7.

Valves 41 in the steam lines are adjusted by hand, or automatically to provide the desired preheating temperature in the preheating compartment 32, a higher pasteurizing temperature (for example 145° F.) in the preliminary pasteurizing compartment 33, and about the same pasteurizing temperature in the main pasteurizing compartment 7.

At the rear end of the cooling compartment 8, cold water is introduced through a pipe 42 and projected toward the front end, as suggested in Fig. 1. This cooling compartment is provided with an overflow pipe 43 at its front end, as shown in Figures 1 and 2.

The front end of the refrigerating compartment at the bottom of the apparatus, is provided with an inlet pipe 44, through which refrigerated liquid is introduced, and the rear portion of this compartment is equipped with a pipe 45 through which liquid returns to the refrigerating apparatus (not shown). An overflow pipe 46 lies adjacent to said return pipe 45.

To compensate for evaporation and the removal of water carried by the bottles and their conveyor, and also to circulate and prevent stagnation of the water, a small stream of fresh water is admitted through an inlet pipe 47 at the front end of the preheating compartment. This also provides a desirable relatively low temperature at the intake end of the preheating compartment.

The hot water at the opposite end of this compartment overflows at 48 through the partition 31 to the preliminary pasteurizing compartment 33. The rear end of this pasteurizing compartment is provided with an overflow at 49 (Fig. 4) through which liquid is discharged into the rear of the main pasteurizing receptacle 7, and the front of this receptacle 7 has an overflow pipe 50.

It will now be understood that the several horizontally elongated compartments are well adapted to receive and circulate heating and cooling fluids which provide the desired gradual increase in temperature, followed by a gradual decrease until the bottles pass from the refrigerating liquid. The horizontal arrangement enables these results to be most effectively accomplished in an economical manner, and the high and low temperatures are maintained for the desired long periods without undue waste of the heating and cooling fluids. Furthermore, the very low horizontal apparatus is a relatively simple and inexpensive structure, and it can be readily installed and conveniently used in many places not adapted to receive a very tall vertical pasteurizer.

The load resulting from the weight of the long horizontal structure is distributed over a large area, so the foundation to support the same does not involve the high degree of strength required to support a corresponding vertical structure.

The desired very long zones of approximately uniform temperatures can be readily obtained in the horizontal structure herein disclosed, and this is an important advantage over a tall vertical pasteurizer which in actual practice usually includes a vertical column of liquid wherein the bottles are carried downwardly and upwardly in a zig-zag course extending from the top to the bottom of the vertical column, so as to prolong the heating or cooling operation. The temperature in a tall vertical column of liquid is not uniform. The hottest liquid usually lies at the top and the coolest at the bottom, so the bottles traveling in a zig-zag vertical course are subjected to constant variations in the temperature of the liquid. This is due to the thermic circulation which also occurs in a horizontal liquid body, but in our apparatus each horizontal body of liquid is so shallow that there is a relatively slight difference in the temperatures at the top and bottom of the liquid.

Another advantage of this horizontal pasteurizer lies in the arrangement which prevents undesirable heat transfer from one compartment to another. The highest temperature is in the pasteurizing receptacle 7 which lies above the cooling receptacle 8. There is a very great difference in the temperatures of the liquids in these two compartments, and for this reason the bottom of the pasteurizing receptacle 7 may be provided with a double wall, as shown in Figures 3 and 4, to provide an insulating space. However, the natural thermic circulation tends to prevent a transfer of heat from the pasteurizing compartment to the lower cooling compartment.

The hot air and vapor rising from the horizontal pasteurizing compartment tends to heat the bottom of the higher preheating and pasteurizing compartments. This is an economical transfer of heat, and a similar condition appears at the lower portion of the apparatus where the horizontal body of refrigerating liquid 9 lies below the cooling receptacle, the coldest zone being at the bottom.

In other words, at the upper half of the apparatus, a hot pasteurizing zone lies between a higher preheating zone and a lower cooling zone, and in this horizontal arrangement the zone of highest temperature transmits heat to the preheating zone without any undue heat exchange between the hot zones and the lower cooling zone. The horizontal body of refrigerating liquid 9 lies at the bottom of the apparatus where it will not be subjected to the relatively warm air or vapor rising from the higher bodies of liquid.

Moreover, in this horizontal apparatus, each body of heating or cooling liquid is widely separated from the next adjacent body or bodies, a large open air space being formed between the adjacent compartments, so the natural transfer of heat from one zone to another does not correspond to the transfer which occurs in a vertical pasteurizer wherein vertical partitions are relied upon to separate one body of liquid from another.

Another advantage of this horizontal pasteurizer lies in a thermic circulation of the liquid to be pasteurized. This liquid in bottles, or the like, is gradually heated while passing through the horizontally alined preheating and preliminary pasteurizing compartments 32 and 33 at the upper portion of the apparatus. The natural thermic circulation results in a relatively high temperature at the upper portions of the bottles and their contents, but the object is to uniformly heat the liquid to be pasteurized.

Attention is directed to the conditions near the rear end of the apparatus where the conveyor passes from the preliminary pasteurizing compartment to the lower pasteurizing compartment 7. The conveyor rises in an inclined course on stationary guides 51 and travels around guide wheels 14 (Figs. 2 and 4) so as to invert the bottles passing from one pasteurizing compartment to another. The relatively hot upper portions of the bottles are thus located in the lower portion of the pasteurizing compartment 7, and this results in a thermic circulation tending to uniformly pasteurize the liquid.

A similar advantage is obtained by again reversing, or inverting, the bottles as they pass from the hot pasteurizing receptacle 7 to the cooling receptacle 8. As shown at the left of Fig. 3, the bottles leave the hot pasteurizing receptacle in an inclined course where they travel along a stationary plate 52, and as the conveyor travels around the guide wheels 14, the bottles are inverted. The relatively hot upper portion of each bottle leaving the pasteurizing compartment is thus transferred to the lower portion of the liquid in the cooling receptacle 8, and this results in a thermic circulation tending to uniformly cool the bottles and their contents.

As the bottles travel through the long horizontal cooling receptacle 8, the thermic circulation creates a relatively high temperature at the upper portions of the bottles. However, the bottles are again inverted at the rear lower portion of the apparatus whereby they pass from the cooling receptacle 8 to the refrigerating liquid 9, and this inversion locates the relatively warm portions of the bottles at the cold bottom of the refrigerating liquid, so as to produce a thermic circulation tending to uniformly chill the contents of the bottles.

The pasteurizer herein disclosed is a simple, compact and very low horizontal structure adapted to be installed in locations that will not receive a tall vertical pasteurizer. It eliminates, or reduces, the undesirable transfer of heat from one compartment to another which occurs in the vertical pasteurizers, and at the same time provides a desirable heat transfer tending to reduce the operating expense. The thermic circulation resulting from successive inversion of the containers is a desirable feature, and in the structure we have shown, all of these advantages can be obtained by employing a single operator at one end of the apparatus where the bottled liquid is fed into and discharged from the machine.

We claim:

1. In an apparatus for pasteurizing liquids in containers, elongated horizontal receptacles for preheating, pasteurizing and cooling liquids, one of said horizontal receptacles being provided with a partition whereby it is divided into a preheating compartment and a pasteurizing compartment, a baffle member extending from the top of said pasteurizing compartment to a line below the liquid level therein, an endless conveyor traveling through said horizontal receptacles in the order named, said conveyor being provided with holders for said containers, and means guiding said conveyor over said partition and under said baffle member.

2. In an apparatus for pasteurizing liquids in containers, elongated horizontal receptacles for preheating, pasteurizing and cooling liquids, one of said horizontal receptacles being provided with a partition whereby it is divided into a preheating compartment and a preliminary pasteurizing compartment, a baffle member extending from the top of said preheating compartment to a line below the liquid level therein, an endless conveyor traveling through said horizontal receptacles in the order named, said conveyor having holders for said containers, means guiding said conveyor under said baffle member and over said partition, said horizontal receptacles including a main pasteurizing receptacle immediately below said preheating and preliminary pasteurizing compartments, and a cooling receptacle below said main pasteurizing receptacle.

3. In an apparatus for pasteurizing liquids in containers, elongated horizontal receptacles for preheating, pasteurizing and cooling liquids, one of said horizontal receptacles being provided with a partition whereby it is divided into a preheating compartment and a preliminary pasteurizing compartment, a baffle member extending from the top of said preliminary pasteurizing compartment to a line below the liquid level therein, an endless conveyor traveling through said horizontal receptacles in the order named, said conveyor having holders for said containers, means guiding said conveyor over said partition and under said baffle member, said horizontal receptacles including a main pasteurizing receptacle immediately below said preheating and preliminary pasteurizing compartments, and a cooling receptacle below said main pasteurizing receptacle, said preheating compartment having an inlet for fresh liquid, said partition being provided with an overflow through which liquid is discharged to said preliminary pasteurizing compartment, and the last mentioned compartment being provided with an overflow through which pasteurizing liquid is discharged to the main pasteurizing receptacle.

4. In an apparatus for pasteurizing liquids in containers, an elongated horizontal receptacle provided with a partition whereby it is divided into a preheating compartment and a preliminary pasteurizing compartment, an elongated horizontal pasteurizing receptacle immediately below and in heat transferring relationship to said preheating and pasteurizing compartments, an elongated horizontal cooling receptacle below said pasteurizing receptacle, an endless conveyor having holders for the containers, said conveyor being provided with horizontally elongated loops traveling through said receptacles in the order named, and inverting guides cooperating with said conveyor to invert the holders and containers as they pass from one receptacle to another.

5. In an apparatus for pasteurizing liquids in containers, an elongated horizontal receptacle provided with a partition whereby it is divided into a preheating compartment and a preliminary pasteurizing compartment, an elongated horizontal pasteurizing receptacle immediately below and in heat transferring relationship to said preheating and pasteurizing compartments, an elongated horizontal cooling receptacle below said pasteurizing receptacle, a refrigerating receptacle below the bottom of said cooling receptacle, said pasteurizing receptacle having an insulated bottom wall above said cooling receptacle, an endless conveyor having holders for the containers, said conveyor being provided with horizontally elongated loops traveling through said receptacles in the order named, and inverting guides cooperating with said conveyor to invert the holders and containers as they pass from one receptacle to another.

JAS. L. HEROLD.
JOS. W. DAWSON.